(12) United States Patent
Zhang et al.

(10) Patent No.: US 9,613,263 B2
(45) Date of Patent: Apr. 4, 2017

(54) INK STROKE GROUPING BASED ON STROKE ATTRIBUTES

(71) Applicant: Lenovo (Singapore) Pte. Ltd., Singapore (SG)

(72) Inventors: Jianbang Zhang, Cary, NC (US); Song Wang, Cary, NC (US); Zhao Yonggang, Beijing (CN); Qigang Wang, Beijing (CN)

(73) Assignee: Lenovo (Singapore) Pte. Ltd., Signapore (SG)

( * ) Notice: Subject to any disclaimer, the term of this patent is extended or adjusted under 35 U.S.C. 154(b) by 0 days.

(21) Appl. No.: 14/633,983

(22) Filed: Feb. 27, 2015

(65) Prior Publication Data

US 2016/0253556 A1    Sep. 1, 2016

(51) Int. Cl.
*G06K 9/00* (2006.01)

(52) U.S. Cl.
CPC ........... *G06K 9/00402* (2013.01); *G06K 9/00* (2013.01)

(58) Field of Classification Search
CPC ........... G06K 2209/01; G06K 9/00865; G06K 9/3208; G06K 9/34; G06K 9/222; G06K 9/00442; G06K 9/00422; G06K 9/00; G06K 6/00402; G06K 9/00416; G06F 3/04883; G06F 2203/04806; G06F 3/0488; G06F 17/242; G06F 17/211; G06F 17/241; G06F 3/038; G06F 15/0225; G06F 15/025; G06F 17/24; G06F 9/2054; G06F 9/6217; G06F 9/6892; G06F 6/00402; G09B 7/07; G06T 1/0007; G06T 9/20; G07C 9/00158

USPC ........ 382/218, 189, 187, 186, 224; 345/163, 345/168, 173, 179
See application file for complete search history.

(56) References Cited

U.S. PATENT DOCUMENTS

| | | | | |
|---|---|---|---|---|
| 5,491,495 A * | 2/1996 | Ward | ................... | G06F 3/04883 345/163 |
| 5,613,019 A * | 3/1997 | Altman | ............... | G06F 3/04883 382/189 |
| 7,346,230 B2 * | 3/2008 | Dresevic | ............... | G06F 17/211 345/698 |
| 7,564,995 B1 * | 7/2009 | Yaeger | ................... | G06K 9/222 382/119 |
| 8,181,103 B2 * | 5/2012 | Lin | ....................... | G06F 17/242 715/230 |
| 2003/0046087 A1 * | 3/2003 | Johnston | ................. | G06F 3/017 704/275 |
| 2003/0179201 A1 * | 9/2003 | Thacker | ................ | G06F 3/0481 345/441 |

(Continued)

*Primary Examiner* — Vu Le
*Assistant Examiner* — Aklilu Woldemariam
(74) *Attorney, Agent, or Firm* — Ference & Associates LLC (57) ABSTRACT

One embodiment provides a method including: receiving a plurality of handwriting ink strokes; determining, using a processor, at least one grouping of the plurality of handwriting ink strokes, wherein the grouping is determined using spacing associated with the plurality of handwriting ink strokes and at least one attribute associated with at least one portion of the plurality of handwriting ink strokes; sending the at least one grouping to a recognition engine; receiving machine input from the recognition engine; and displaying, on a display device, the machine input. Other aspects are described and claimed.

14 Claims, 3 Drawing Sheets

(56) References Cited

U.S. PATENT DOCUMENTS

| | | | |
|---|---|---|---|
| 2004/0001627 A1* | 1/2004 | Simmons | G06F 17/242 382/186 |
| 2004/0131252 A1* | 7/2004 | Seto | G06F 3/03545 382/179 |
| 2004/0141648 A1* | 7/2004 | Dodge | G06K 9/222 382/188 |
| 2005/0089237 A1* | 4/2005 | Park | G06T 9/20 382/242 |
| 2005/0100214 A1* | 5/2005 | Zhang | G06K 9/222 382/179 |
| 2005/0100218 A1* | 5/2005 | Guha | G06K 9/222 382/187 |
| 2005/0102620 A1* | 5/2005 | Seto | G06K 9/222 715/268 |
| 2007/0005537 A1* | 1/2007 | Abdulkader | G06K 9/00429 706/20 |
| 2010/0215277 A1* | 8/2010 | Huntington | G06K 9/00865 382/218 |
| 2015/0146985 A1* | 5/2015 | Nakasu | G06K 9/222 382/182 |
| 2016/0048324 A1* | 2/2016 | Fukui | G06F 3/04883 715/268 |

* cited by examiner

INK STROKE GROUPING BASED ON STROKE ATTRIBUTES

BACKGROUND

Information handling devices ("devices"), for example cell phones, smart phones, tablet devices, laptop computers, and the like permit users to input handwriting using a finger or pen/stylus. This allows users to write more naturally and without the use of a keyboard. A user may provide handwriting ink strokes (e.g., letters, numbers, characters, symbols, etc.) in an input field. The handwriting ink strokes may then be sent to recognition software to be converted from handwriting ink strokes to machine input or machine text.

BRIEF SUMMARY

In summary, one aspect provides a method, comprising: receiving a plurality of handwriting ink strokes; determining, using a processor, at least one grouping of the plurality of handwriting ink strokes, wherein the grouping is determined using spacing associated with the plurality of handwriting ink strokes and at least one attribute associated with at least one portion of the plurality of handwriting ink strokes; sending the at least one grouping to a recognition engine; receiving machine input from the recognition engine; and displaying, on a display device, the machine input.

Another aspect provides an information handling device, comprising: a processor; a display device operatively coupled to the processor; a memory device that stores instructions executable by the processor to: receive a plurality of handwriting ink strokes; determine at least one grouping of the plurality of handwriting ink strokes, wherein the grouping is determined using spacing associated with the plurality of handwriting ink strokes and at least one attribute associated with at least one portion of the plurality of handwriting ink strokes; send the at least one grouping to a recognition engine; receive machine input from the recognition engine; and display, on the display device, the machine input.

A further aspect provides a product, comprising: a storage device having code stored therewith, the code being executable by the processor and comprising: code that receives a plurality of handwriting ink strokes; code that determines at least one grouping of the plurality of handwriting ink strokes, wherein the grouping is determined using spacing associated with the plurality of handwriting ink strokes and at least one attribute associated with at least one portion of the plurality of handwriting ink strokes; code that sends the at least one grouping to a recognition engine; code that receives machine input from the recognition engine; and code that displays the machine input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Some information handling devices (e.g., smart phones, tablets, smart watches, laptop computers, personal computers, etc.) allow users to enter handwriting ink strokes at an input field. This input field may be located on the information handling device ("device") or may be operatively coupled to the device through a wired or wireless connection. Often the user desires that the handwriting ink strokes be converted to machine input or machine text. In this case, the device may send the handwriting ink strokes (e.g., characters, symbols, numbers, letters, etc.) to a recognition engine. The handwriting ink strokes may be sent to the recognition engine as the user is providing the input. Alternatively, the ink strokes may be sent to the recognition engine after the user is done providing input or upon a command by the user to send the ink strokes for recognition. The engine may then convert the handwriting ink strokes to machine input or machine text and provide this back to the user, for example, by displaying the machine input on the display device.

Different amounts of input may be sent to the recognition engine for conversion to machine input. For example, in some cases the ink strokes are grouped using spacing (e.g., words, sentences, paragraphs, etc.) or ink stroke proximity and the ink strokes contained within the grouping are sent to the recognition engine. The recognition engine then returns a whole string including all ink strokes contained within the grouping. For example, in an effort to assist the recognition engine in creating a correct conversion, often a group of ink strokes including adjacent ink strokes (e.g., a couple words, phrase, etc.) are sent to the recognition engine. This allows the recognition to use context to determine the correct conversion. Current recognition engines can typically only analyze three or four words of context. If too many words are sent, the engine may get confused or may just ignore the "extra" ink strokes. The issue is that it is difficult to determine which and how many words should be sent to the recognition engine to assist in a context determination.

Another issue with the recognition engine sending all the ink strokes within a particular space is that a user may not intend for the entirety of the ink strokes within a particular space to be recognized as a group. Rather, the user may want the ink strokes to be recognized as separate words. For example, a user may write words together in such a way that the recognition engine recognizes them as an entire sentence even though the user has written them as unrelated words. Upon receiving the machine input from the recognition engine, the engine may have used all the ink strokes to determine context and may result in a machine input which does not match the ink strokes the user wrote. Additionally, if a user later adds ink strokes in the same general area as previous ink strokes, the recognition engine may analyze the old and new ink strokes as a group, even though the ink strokes do not make sense as a group nor were they intended to be a group.

Another issue with this method arises when a user later annotates the ink strokes that have already been recognized by the recognition engine. In such a case often all the ink strokes within the area, i.e., including the original ink strokes and the annotations, are sent to the recognition engine. This combining of the old ink strokes or recognized machine input and new ink strokes can cause the recognition engine to mix results, the resulting machine input may become illegible, and the intended meaning of the user may get confused.

Alternatively, only the annotations may be sent to the recognition engine. The issue with this method is that the user may intend for the annotations to modify the old ink strokes or already recognized machine input. For example, a user may write the word "analyze" and later strikethrough the "ze" and write "sis" above the word, intending to make the word "analysis". However, the recognition engine may have already converted "analyze" to machine input and upon receiving the annotation, the recognition engine may just return "sis", giving the user machine input that reads "analyze" with "sis" above the word.

These technical issues present problems for users in that ink strokes may not be grouped in a way that results in intelligible or correct machine input. Especially difficult is determining which ink strokes contained within a particular space should be sent to the recognition engine. Additionally, when a user annotates previously entered ink strokes or already recognized machine input, it is difficult to determine whether the annotations should be analyzed together with or separately from the ink strokes or machine input. If a device had a method of intelligently grouping ink strokes based not only on spacing but also on ink stroke attributes, the machine input result may more accurately reflect the intention of the user and may result in a better machine input conversion.

Accordingly, an embodiment provides a method of grouping ink strokes based upon ink stroke attributes. First, an embodiment creates a grouping of the ink strokes based upon the spacing of the ink strokes, similar to the current methods in use. An embodiment then determines whether attributes (e.g., color, width, size, brush style, time stamp, recognition confidence score, etc.) of handwriting ink strokes are similar or different between different portions of the ink strokes. Upon determining whether the attributes are similar or different, an embodiment creates a grouping to send to a recognition engine. Based upon the determination of whether the attributes are similar, the grouping may contain the entirety of the ink strokes or may instead contain a subset of the ink strokes. In one embodiment, the grouping may contain annotations that the user has made to previously entered ink strokes or previously recognized machine input. The recognition engine converts the ink strokes contained within the grouping to machine input or machine text. An embodiment receives this machine input and displays the machine input on a display device for the user.

The illustrated example embodiments will be best understood by reference to the figures. The following description is intended only by way of example, and simply illustrates certain example embodiments.

Figure 1:
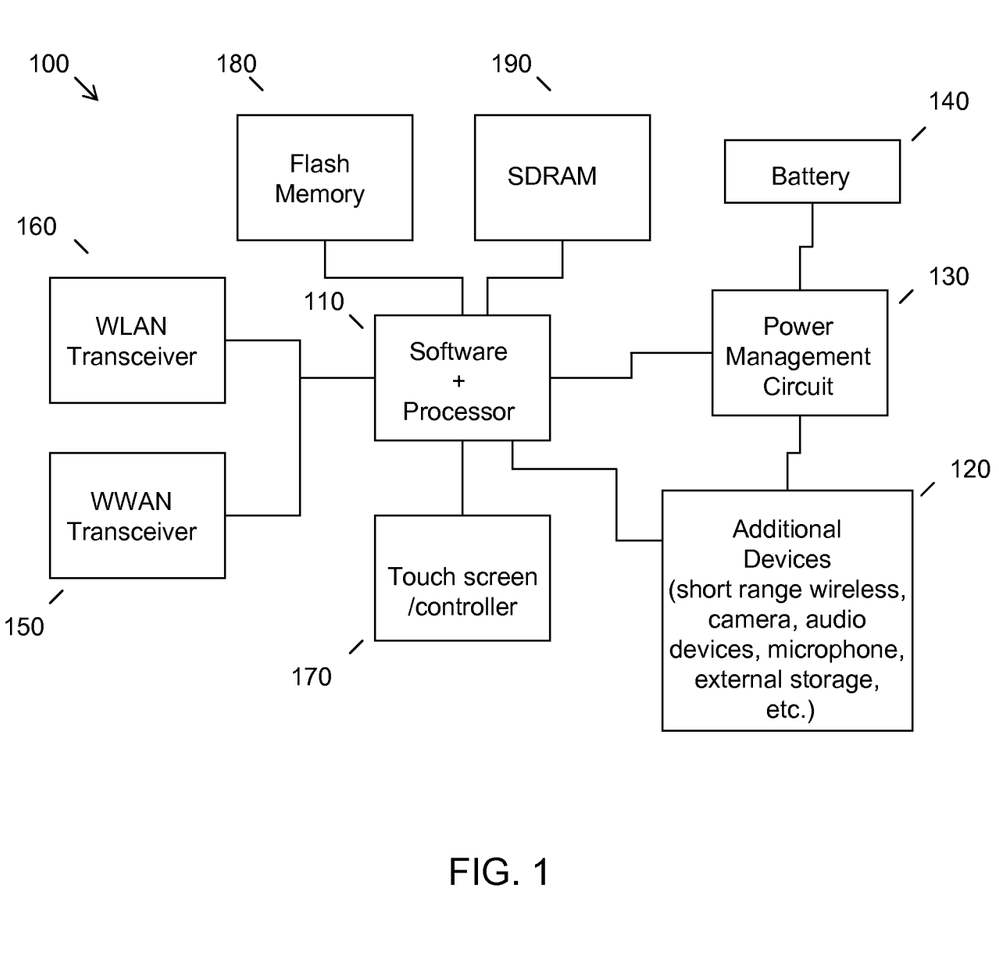
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input, including handwriting input, and display/rendering. System 100 also typically includes various memory devices, for example flash memory 180 and SDRAM 190.

Figure 2:
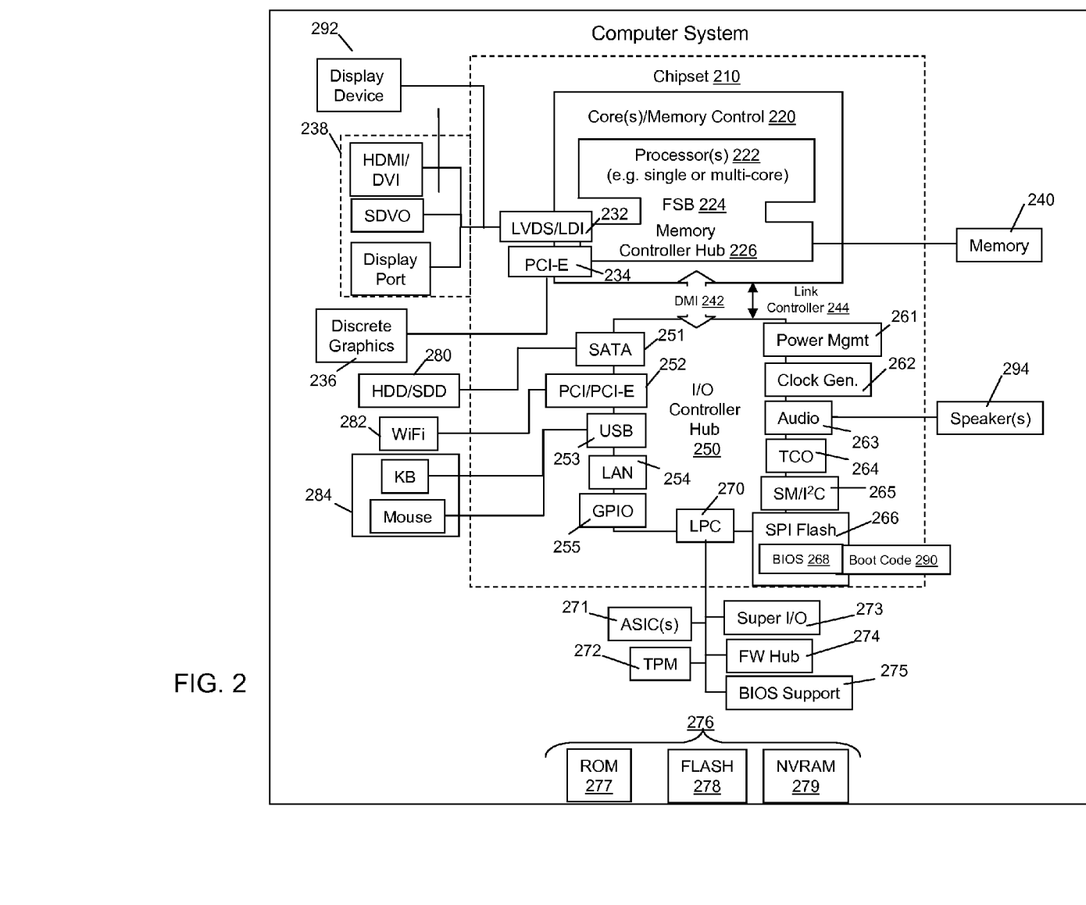
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, handwriting input device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to enter handwriting input. Alternatively, the devices may be used to process handwriting input and convert that input into machine input or machine text. For example, the circuitry outlined in FIG. 1 may be implemented in a tablet or smart phone embodiment, whereas the circuitry outlined in FIG. 2 may be implemented in a personal computer embodiment.

Figure 3:
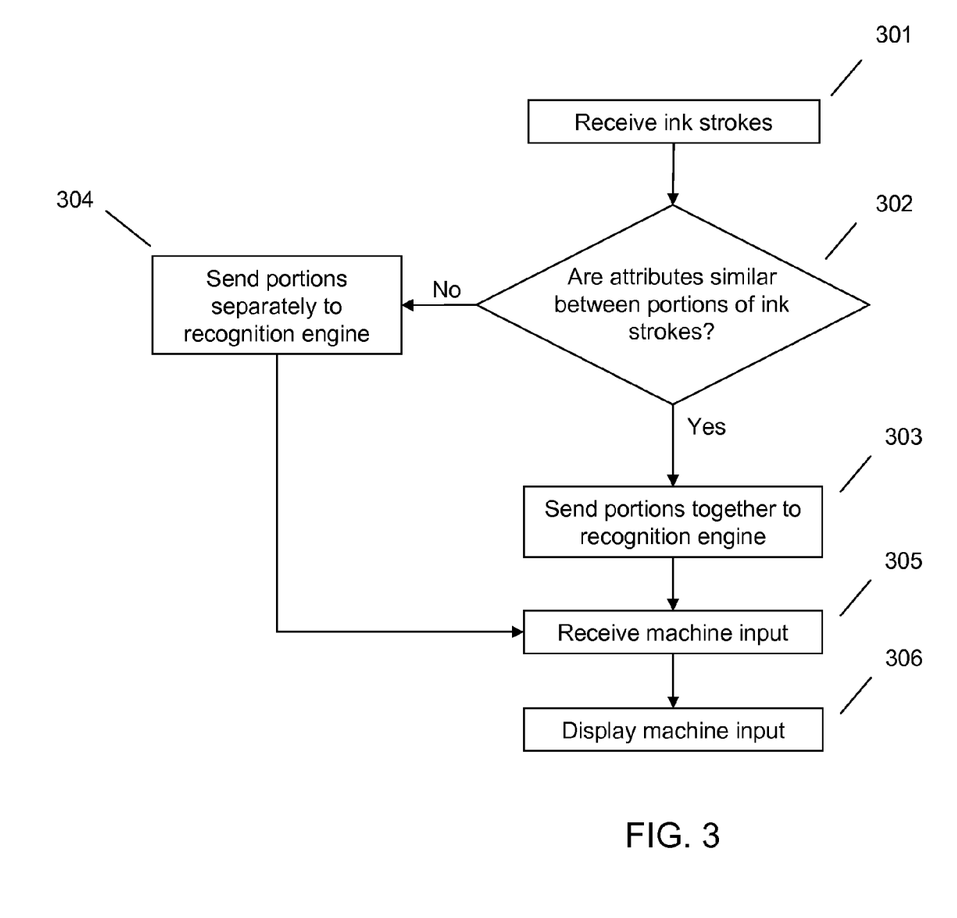
FIG. 3 illustrates an example method of ink stroke grouping based on stroke attributes.

Referring now to FIG. 3, at 301, an embodiment may receive a plurality of handwriting ink strokes. In one embodiment this receiving may include accepting handwriting input that the user has entered on a display and/or input device. For example, a user may write on the display/input device of a tablet. Alternatively or additionally, the receiving may include receiving previously entered handwriting ink strokes from another information handling device. For example, a user may enter handwriting input on a smart phone. The smart phone may then send this handwriting input to a remote device (e.g., cloud device, remotely connected storage device, information handling device wirelessly connected, wired information handling device, etc.) for analysis and processing.

In one embodiment, the plurality of ink strokes may contain multiple subsets of ink strokes. For example, the plurality of ink strokes may contain two subsets of ink strokes, the first subset containing old ink strokes (i.e., ink strokes previously entered by the user), and the second subset containing new ink strokes (i.e., ink strokes more recently entered by the user). For example, a user may have entered ink strokes five minutes ago and two minutes ago added annotations to those ink strokes. The ink strokes entered five minutes ago may be considered old ink strokes and the ink strokes entered two minutes ago may be considered new ink strokes. Alternatively, the subsets may contain ink strokes divided by attributes different than time. For example, the first subset may contain ink strokes which are green, and the second subset may contain ink strokes which a red. Two subsets are used as example only, embodiments may contain more than two subsets and the subsets may be divided using different attributes.

At 302, an embodiment may determine a grouping of the plurality of handwriting ink strokes. In one embodiment a first grouping may be determined using spacing, distance, or proximity of the ink strokes. For example, a first grouping may be determined because all the ink strokes are contained within a single input field. As an alternative example, a first grouping may be determined because all the ink strokes are within a one inch radius of a central point.

An embodiment may then determine whether the entirety of the grouping should be sent to the recognition engine or if the grouping should be split. In other words, an embodiment determines if the user intends the grouping of words to be considered as a group or if the user may have intended the different ink strokes to be considered separately. To determine whether the ink strokes should be recognized separately or together, an embodiment may use an attribute associated with at least a portion of the ink strokes. The attribute may be associated with the ink strokes themselves. For example, the groupings may be dependent on stroke color, stroke width, stroke size, stroke brush style, stroke time stamp, and the like. The attribute may alternatively be based upon the position of the ink strokes, for example, if some ink strokes are above or below other ink strokes, they may be grouped separately. The attribute may be based upon the type of ink stroke, for example, if some ink strokes are characters as opposed to numbers, they may be grouped separately.

In an alternative embodiment, the grouping may be based upon a recognition confidence score. For example, once the groupings are sent to the recognition engine, the recognition engine may convert the ink strokes to machine input. After this conversion the recognition engine may use a recognition confidence score (e.g., how confident the engine is that the ink strokes were converted correctly) to determine whether the grouping was correct. The recognition confidence score can be calculated in a number of ways which are well known in the art. If the confidence score is low, an embodiment may regroup the ink strokes to create a better grouping which may receive a better confidence score.

In one embodiment, the determination at 302, may be made by comparing the chosen attribute(s) of one portion of the ink strokes with the same attribute(s) of another or the remaining portion of the ink strokes. For example, an embodiment may compare the color of the ink strokes between all the ink strokes. It may determine that the ink strokes contained within a particular portion, for example, a word, are purple, while the ink strokes contained within the another portion, for example, another word, are orange. In one embodiment, the portions may comprise the subsets of the handwriting ink strokes which an embodiment may have previously received. The attributes of the subsets may then be compared to determine a grouping of the ink strokes.

If, at 302, an embodiment determines that the attributes between the different portions of ink strokes are similar, an embodiment may group the ink strokes together and send this grouping to the recognition engine at 303. For example, assuming an embodiment received subsets of ink strokes and an embodiment determined that all or most of the attributes between the subsets are similar, the grouping may contain both the first and second subset of ink strokes. If, however, at 302, an embodiment determines that the attributes between the different portions of ink strokes are different, an embodiment may separate the ink strokes into, for example, two separate groups, and send each group individually to the recognition engine at 304. For example, if an embodiment determines that the attributes between the two subsets are different the first subset would be sent to the recognition engine separate from the second subset.

It should be noted that an embodiment may group ink strokes together even if not all the attributes are similar. For example, an embodiment may group ink strokes that have been written at substantially different times together based upon other attributes which are similar. In other words, a difference of a single attribute or even more than one attribute may not result in separate groupings.

For example, an embodiment may receive a handwriting ink stroke that is adjacent to machine input or previously entered ink strokes (e.g., a user has annotated previously entered ink strokes or previously recognized machine input) and may group these together. As an example, a user may write a word which is converted to machined input, and then may then cross out the machine input word and write another word above it. As a second example, a user may write a word which is converted to machine input and then cross out letters associated with the word and write new letter above it. In the first example, the grouping sent to the recognition engine may contain only the word above the crossed out word. In the second example, the grouping sent to the recognition engine may include the previously recognized word and the annotations above the word.

In order to assist in determining whether to send the old ink strokes/machine input and the annotation together or separately, one embodiment may include a feature which allows a user to indicate to an embodiment that they should be sent together or separately. For example, an embodiment may recognize a particular grouping of symbols as an indication that the ink strokes and annotations should be sent together. This grouping of symbols may be a default or may be set by the user. For example, a user may indicate that if an embodiment detects "=+" then that indicates the group should be sent together.

Once an embodiment has sent portions to the recognition engine, either together at 303 or separately at 304, an embodiment may receive machine input from the recognition engine at 305. The machine input may comprise machine text which represents the grouping that was sent to the recognition engine. For example, if the recognition has received the first subset of handwriting ink strokes, the machine input may comprise machine text which includes the word included in the first subset. An embodiment may then display this machine text on a display device at 306.

The various embodiments described herein thus represent a technical improvement to current handwriting recognition engines in that an embodiment provides a method of grouping handwriting ink strokes based not only on spacing and proximity of the ink strokes, but also on attributes associated with the different portions of the ink strokes. Using the techniques described herein, the groupings of ink strokes sent to a recognition engine are more intelligently grouped, which creates a conversion more closely resembling what the user intended and desired to be converted together and separately. The user, therefore, receives machine input that more closely resembles the handwriting ink strokes that they actually entered.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving a plurality of handwriting ink strokes, wherein the plurality of handwriting ink strokes comprise a first subset of ink strokes and a second subset of ink strokes;
   determining, using a processor, at least one grouping of the plurality of handwriting ink strokes, wherein the at least one grouping is determined using spacing associated with the plurality of handwriting ink strokes and comparing at least one attribute associated with at least one portion of the first subset of ink strokes to at least one attribute associated with at least one portion of the second subset of ink strokes;
   wherein, if the at least one attribute associated with at least one portion of the first subset of ink strokes is similar to the at least one attribute associated with at least one portion of the second subset of ink strokes, the at least one grouping comprises the first subset of ink strokes and the second subset of ink strokes;
   wherein, if the at least one attribute associated with at least one portion of the first subset of ink strokes is different than the at least one attribute associated with at least one portion of the second subset of ink strokes, the at least one grouping comprises a subset of ink strokes selected from the group consisting of: the first subset of ink strokes and the second subset of ink strokes;
   sending, using a processor, the at least one grouping to a recognition engine;
   receiving, using a processor, machine input from the recognition engine; and
   displaying, on a display device, the machine input.

2. The method of claim 1, wherein the determining comprises comparing the at least one attribute associated with the at least one portion of the plurality of handwriting ink strokes to the at least one attribute associated with another portion of the plurality of handwriting ink strokes.

3. The method of claim 1, wherein the at least one attribute comprises one or more of: color, width, size, brush style, time stamp, and recognition confidence score.

4. The method of claim 1, further comprising receiving at least one handwriting ink stroke adjacent to a machine input.

5. The method of claim 4, wherein the at least one grouping comprises the machine input and the at least one handwriting stroke adjacent to the machine input.

6. The method of claim 4, wherein the at least one grouping comprises the at least one handwriting ink stroke adjacent to the machine input.

7. The method of claim 1, wherein the machine input comprises machine text representing the at least one grouping of the plurality of handwriting ink strokes.

8. An information handling device, comprising:
   a processor;
   a display device operatively coupled to the processor;
   a memory device that stores instructions executable by the processor to:
   receive a plurality of handwriting ink strokes, wherein the plurality of handwriting ink strokes comprise a first subset of ink strokes and a second subset of ink strokes;
   determine at least one grouping of the plurality of handwriting ink strokes, wherein the at least one grouping is determined using spacing associated with the plurality of handwriting ink strokes and comparing at least one attribute associated with at least one portion of the first subset of ink strokes to at least one attribute associated with at least one portion of the second subset of ink strokes;
   wherein, if the at least one attribute associated with at least one portion of the first subset of ink strokes is similar to the at least one attribute associated with at least one portion of the second subset of ink strokes, the at least one grouping comprises the first subset of ink strokes and the second subset of ink strokes;
   wherein, if the at least one attribute associated with at least one portion of the first subset of ink strokes is different than the at least one attribute associated with at least one portion of the second subset of ink strokes, the at least one grouping comprises a subset of ink strokes selected from the group consisting of: the first subset of ink strokes and the second subset of ink strokes;
   send the at least one grouping to a recognition engine;
   receive machine input from the recognition engine; and
   display, on the display device, the machine input.

9. The information handling device of claim 8, wherein to determine comprises comparing the at least one attribute associated with the at least one portion of the plurality of handwriting ink strokes to the at least one attribute associated with another portion of the plurality of handwriting ink strokes.

10. The information handling device of claim 8, wherein the at least one attribute comprises one or more of: color, width, size, brush style, time stamp, and recognition confidence score.

11. The information handling device of claim 8, wherein the instructions are further executable by the processor to receive at least one handwriting ink stroke adjacent to a machine input.

12. The information handling device of claim 11, wherein the at least one grouping comprises the machine input and the at least one handwriting stroke adjacent to the machine input.

13. The information handling device of claim 11, wherein the at least one grouping comprises the at least one handwriting ink stroke adjacent to the machine input.

14. A product, comprising:

a non-signal storage device having computer readable program code stored therewith, the computer readable program code being executable by a processor and comprising:

computer readable program code that receives a plurality of handwriting ink strokes, wherein the plurality of handwriting ink strokes comprise a first subset of ink strokes and a second subset of ink strokes;

computer readable program code that determines at least one grouping of the plurality of handwriting ink strokes, wherein the at least one grouping is determined using spacing associated with the plurality of handwriting ink strokes and comparing at least one attribute associated with at least one portion of the first subset of ink strokes to at least one attribute associated with at least one portion of the second subset of ink strokes;

wherein, if the at least one attribute associated with at least one portion of the first subset of ink strokes is similar to the at least one attribute associated with at least one portion of the second subset of ink strokes, the at least one grouping comprises the first subset of ink strokes and the second subset of ink strokes;

wherein, if the at least one attribute associated with at least one portion of the first subset of ink strokes is different than the at least one attribute associated with at least one portion of the second subset of ink strokes, the at least one grouping comprises a subset of ink strokes selected from the group consisting of: the first subset of ink strokes and the second subset of ink strokes;

computer readable program code that sends the at least one grouping to a recognition engine;

computer readable program code that receives machine input from the recognition engine; and computer readable program code that displays the machine input.

* * * * *